Figure 1:
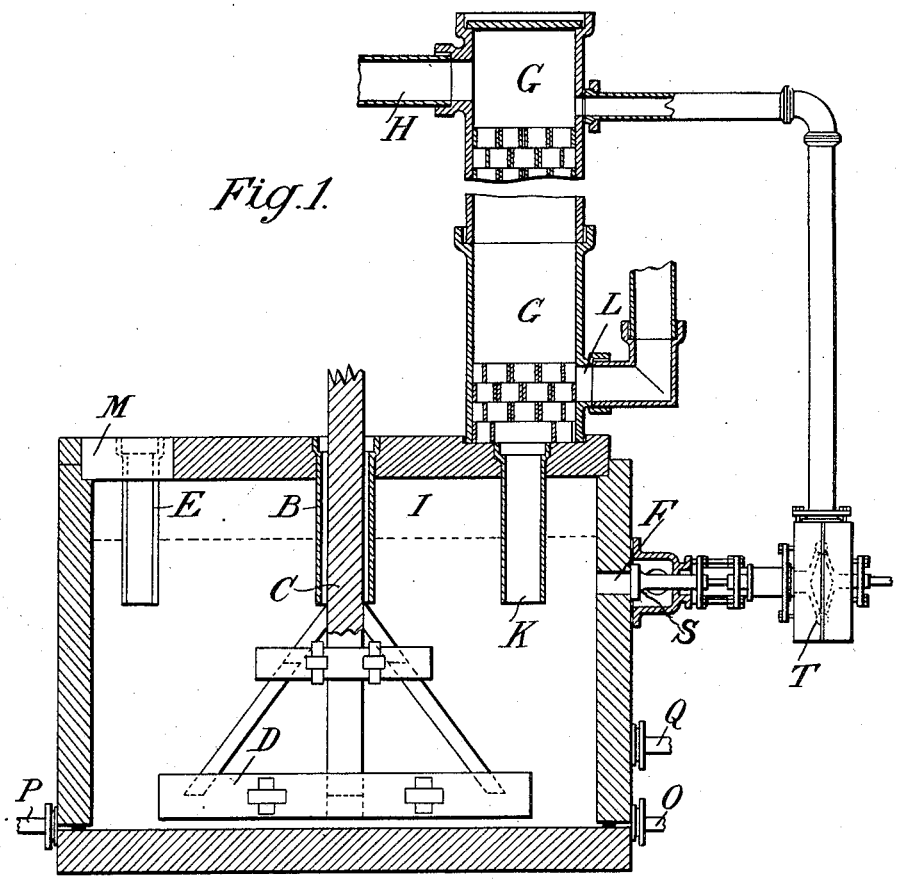

No. 843,986. PATENTED FEB. 12, 1907.
H. BAKER & A. T. SMITH.
PROCESS FOR THE TREATMENT OF SULFID ORES.
APPLICATION FILED JUNE 22, 1906.

3 SHEETS—SHEET 1.

WITNESSES.

INVENTORS
Harry Baker
Andrew Thomas Smith

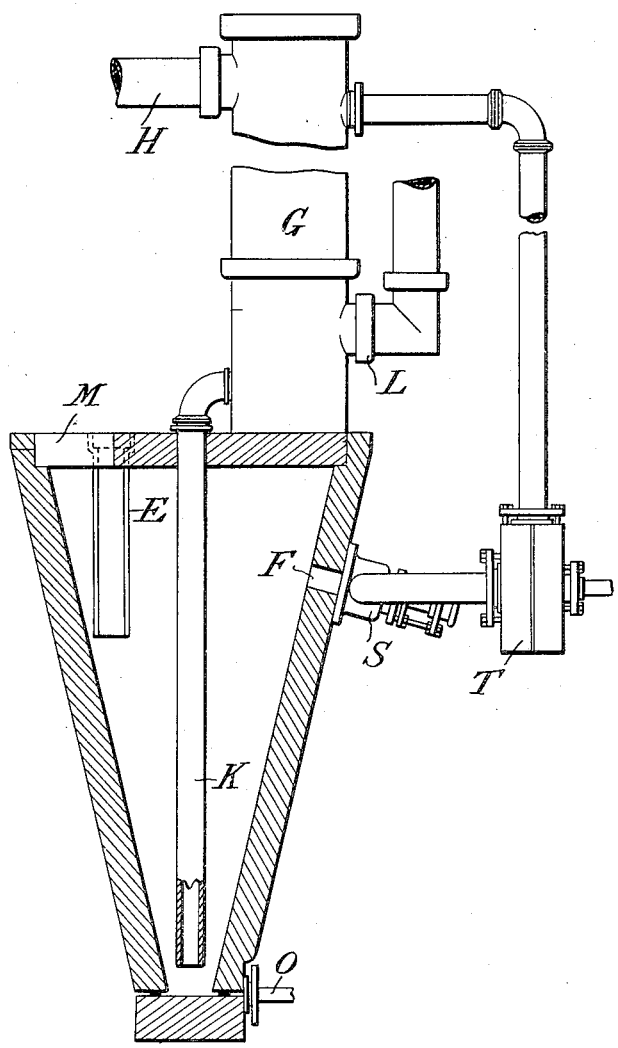

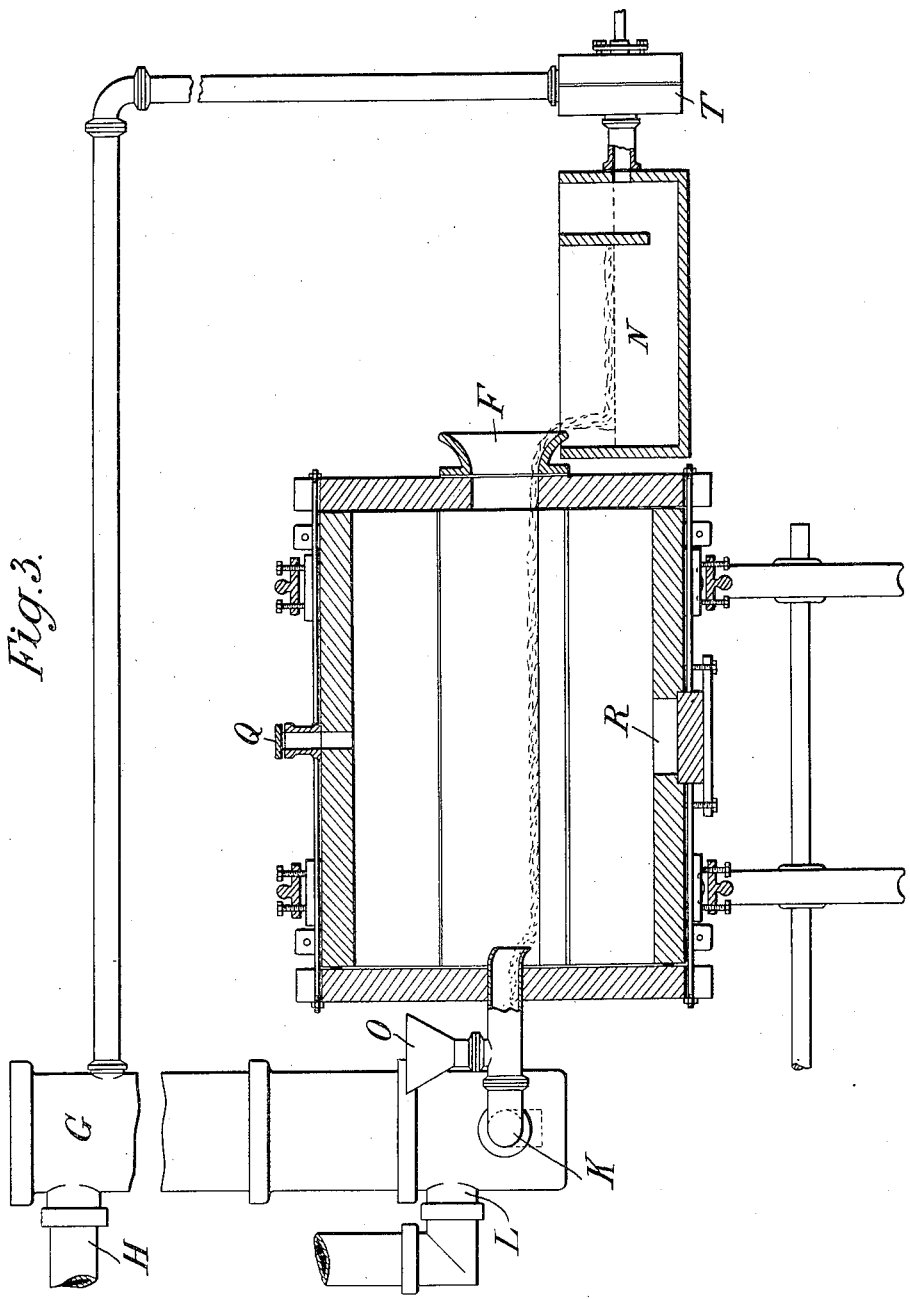

UNITED STATES PATENT OFFICE.

HARRY BAKER AND ANDREW THOMAS SMITH, OF WESTON POINT, ENGLAND.

PROCESS FOR THE TREATMENT OF SULFID ORES.

No. 843,986.    Specification of Letters Patent.    Patented Feb. 12, 1907.

Application filed June 22, 1906. Serial No. 322,869.

*To all whom it may concern:*

Be it known that we, HARRY BAKER and ANDREW THOMAS SMITH, both subjects of the King of Great Britain, and residents of Weston Point, Cheshire, England, have invented a new and useful Improved Process for the Treatment of Sulfid Ores, of which the following is a specification.

Among other processes it has heretofore been proposed to treat complex sulfid ores with aqueous solutions of cupric chlorid and sodium chlorid or calcium chlorid and as an entirely subsequent and separate operation, and after treating the liquor obtained above to free it from metals acquired from the ore to reconvert the cuprous chlorid into cupric chlorid by an intricate atmospheric oxidation and precipitation method. It has also been proposed to use aqueous solutions of ferric chlorid, and as an entirely subsequent and separate operation and after treating with iron or zinc the liquor obtained above to free it from metals or some of them acquired from the ore to reconvert the ferrous chlorid into ferric chlorid by treatment with chlorin or otherwise. It has further been proposed to employ aqueous solutions of salt or magnesium chlorid and chlorin.

The present invention relates to certain improvements in these known processes.

Briefly stated, the nature of the invention may be described as consisting in treating such ores while in a fine state of division and while suitably agitated to the apparent action of chlorin, but in such a way that the chlorin before it reaches the ore or the sulfur liberated from the ore in the preceding moments is absorbed by the ferrous or cuprous chlorids present and is thereby converted into ferric or cupric chlorids. These higher chlorids, it is well known, will react on the further portions of the ore and are thus rapidly exhausted, being reconverted into inert ferrous and cuprous chlorids; but it is of the essence of this invention that small quantities of ferrous and cuprous chlorids admixed with the chlorids or any other metals obtained from the ore should by their oft-repeated chlorination change to the higher chlorids, and thus act as chlorin-carriers to the whole of the chloridizable material in the ore as zinc, lead, maganese, and still further quantities of iron and copper, so that the ratio of either iron or copper, to say zinc, is no more in the final liquor obtained than it is in the ore itself.

Further, it is of the essence of this invention that no other extraneous materials—as sodium chlorid, calcium chlorid, magnesium chlorid—which would interfere with the recovery of the zinc of the ore in the form of pure zinc chlorid are introduced, and also that the absorption of the chlorin is so effected that the liberated sulfur, which toward the end of the run comes to the surface in the form of a foam, is not brought into contact with chlorin gas, whereby chlorid of sulfur and its decomposition products would be formed and also that the said foam of crude sulfur may be removed in any convenient way.

If the ore treated was a pure sulfid of zinc, the chlorid of zinc produced by the process described could then be readily separated from the accompanying iron chlorid and the pure zinc chloric converted to a metallic state, setting free the chlorin, which could be employed for converting ferrous chlorid into ferric chlorid; but the complex ores to the treatment of which this invention is mainly directed usually also contain lead sulfid, and while this will be converted into a lead chlorid the latter is only soluble in water to a very limited extent. To render such lead insoluble in the solution and to separate it from the zinc metallic iron is added, which metal, having a greater affinity for chlorin than the lead, combines with the chlorin, forming ferrous chlorid, while the lead is thrown down in a metallic state, in which form it may be readily separated from the solution. If copper sulfid be present in the ore, it also will be converted into a soluble chlorid, from which metallic copper would be thrown down with the lead, and to separate these metals it will only be necessary to reconvert them into the chlorid salts in the presence of but little water, in which, while the copper salt is readily soluble, the lead salt is not and may be separated by filtration, when the metals may be again but separately thrown down by adding iron to their solutions and to the sludge, while the chlorid of iron so produced may be converted into ferric chlorid, and to this oxid of zinc may be added, thus producing a chlorid of zinc and iron oxid. If silver be present in the ore, it will separate from the zinc in a manner analogous to that of lead, which it will follow and from which it may be separated by the usual known means. Gold also, if present, and with a little care may be caused to follow and separate out either with the lead and silver or with the copper, from either of which it may be separated by the known methods.

For practical manufacture or separation of the metals it is proposed that for the initial charge the finely-divided ore be added to a quantity of water and be thoroughly agitated therein until the ore is practically suspended in the liquid; but in all succeeding charges we may use a portion of the liquor from a preceding charge, with or without an intermediate purification and (or) the various wash-waters and water to make up the necessary quantity, and the turbid liquid is then treated with chlorin in the form of ferric or like chlorid, so as to insure that practically no free chlorin is present. The proportions should be such that there is present a suitable amount of both a lower and a higher chlorid of such a metal as iron, one of the chlorids of which is capable of acting as an energetic absorber of chlorin and the other as an energetic agent for attacking metallic sulfids, so as to produce as new products the chlorid of the metallic sulfid attacked and free sulfur. The reason for thus controlling the action of the chlorin is to prevent the formation of chlorin-water, which would act upon the finely-divided sulfur previously liberated from the ore, producing sulfuric and hydrochloric acids. The formation of these acids in any considerable quantity leads to complications in the succeeding processes and to the possible loss of sulfur if the sulfuric acid has to be removed by precipitation as useless calcium sulfate. Further, sulfuric acid in the presence of lead ores may coat the particles of such ore with a coherent coating that tends to protect them from the further action of the solvent or corrosive liquid. The object of using a proportion of liquor from a previous charge is to have present from the moment of starting the treatment with chlorin gas a sufficient charge of ferrous chlorid to absorb the chlorin as fast as it can be supplied, thus producing ferric chlorid, which in turn parts with one atom of its chlorin to the metals in the ore and again becoming ferrous chlorid and being again reconverted to ferric chlorid, and so on, and, secondly, the object is to have a liquor present with an increased viscosity and specific gravity, so as to aid in suspending and distributing the powdered ore and to aid in the flotation of the sulfur scum as soon as the sulfur is sufficiently liberated from the ore. Iron sulfids are almost universally contained in or are found admixed with all other metallic-sulfid ores, and therefore there is generally no necessity to add any extraneous iron to start the initial operation, though this may be done, if desired, by adding a portion of an iron-sulfid ore or a portion of ferrous chlorid solution known as "galvanizer's waste pickle," &c.; but such additions should not be made in larger quantity than is really necessary, because the excess of iron may be somewhat inconvenient in the after treatment. In subsequent operations there is always an ample supply of chlorin absorbent present. Without binding ourselves to any particular quantity we may say that we have found the presence of the equivalent of two grams of metallic iron per liter of liquor to be quite sufficient to absorb chlorin at a rate which is commercially quite satisfactory, and also in a very complete manner from such chlorin as is manufactured on a large scale without unusual precautions. In all the preceding it is distinctly explained that the chlorin is not used itself to attack the sulfid ore, but that ferric chlorid or the like body is used to attack the ore and that it is the one remnant of the ferric chlorid—viz., the ferrous chlorid—that is acted upon by the chlorin. The success of this method of leaching will not solely depend on the use of ferrous and ferric chlorids as absorber and carrier of chlorin, as other features must be attended to, as hereinafter set forth. The necessity for agitating in gas-tight vessels during treatment is obviated by our invention, inasmuch as the chlorination of the ore is effected by ferric chlorid and the reduced ferric chlorid is rechlorinated in a separate vessel. Bulky lead chlorid and a magma of sulfur are formed in the reaction, and the ore particles might thereby be screened from further action. We prevent this screening by leaching in vats with a quantity of liquor at least several times the weight of the ore and by keeping the contents of the vats strongly agitated, so that the particles are in motion or suspension the whole time. We assist the suspension of these particles by working with strong solutions—for example, of specific gravity 1.2 to 1.5—and, further, we assist the suspension by making the particles themselves as small as possible—i. e., we grind the ore very finely, for example, until it all passes through a wire-gauze with sixteen meshes to the linear inch, although we prefer to use a much finer mesh—say forty to the linear inch.

Iron vessels, pipes, valves, &c., are corroded through in a few hours. Iron or wood vessels lined with lead are no better. Wooden vessels are difficult to keep tight, and, moreover, they are subject to considerable wear. The method of leaving the ore in a heap and allowing the liquor to percolate is exceedingly slow and is not so complete as is our method now described.

We judge that the following forms of apparatus, which are given as practical examples, will be serviceable.

Referring to the drawings, Figures 1, 2, and 3 are mainly sectional elevations, of which Fig. 1 is first described. In this form the reaction vessel is a large stone tank of, say, six hundred cubic feet capacity, such as is used for the generation of chlorin from manganese dioxid and hydrochloric acid. Through a central earthenware pipe B, dependent from the top stone, is passed a strong beam C, of suitable wood, as teak, or of stone or slate, suspended, guided, and driven from above and also so arranged that it may be raised or lowered a short distance at will in any convenient manner. This arrangement is of considerable importance, as with a given ore and given tank it is a most important factor in determining the amount of material that can be treated at one operation without the load of undecomposed ore or the insoluble residuals exerting too great a drag on the mechanical agitator, especially if the agitation is interrupted for any reason or accidentally. Upon this shaft C and inside the tank there is built up by dovetailing and wedges of the same materials a large stirrer D, that particularly agitates any heavy particles which settle on the bottom, and also stirs the whole contents of the tank. The woodwork may be boiled in crude ozocerite and linseed-oil, or similar inert protective and also may be coated with tar. The ferric chlorid attacks the wood but slowly, and though the bottom of the stirrer is subject to abrasion it is nevertheless easily replaced. An earthenware pipe E, also dependent from the top stone, is used for the introduction of supplies of liquor or ores or for the taking of samples, &c. The chlorin may be put under pressure by a pump and then made to bubble through the turbid liquor; but we judge it preferable to absorb the chlorin in a small absorption-tower G, through which a portion of the turbid liquor is rapidly circulated, and to secure this we propose to place a hole F on one side of the tank and sufficiently below the working level of the liquor to insure that none of the liberated sulfur which floats up to the surface toward the end of the operation and there forms a thick scum enters the hole, and yet placed sufficiently above the bottom of the tank to insure that none of the heavier particles of undecomposed ore accumulated on or near the bottom enter the hole. Attached to this hole by a valve S and a pipe is a centrifugal pump T, which serves to draw the liquor and deliver it to the top of the absorption-tower G. The valve-pipes and centrifugal may be made of earthenware or of ebonite; but metal of all kinds should be kept from contact with the highly corrosive liquor.

The valves, pipes, and centrifugal should be of sufficient dimensions and power to keep up a rapid and copious flow of liquor over the packing-pieces in the absorbing-tower. By way of example, the size of a suitable pipe and valve would probably be five inches diameter, and the centrifugal proportionate to this. The importance of this copious flow arises from the fact that it is a main factor in determining the rate at which the ore can be treated and in preventing troubles and loss arising from the possible oxidation of part of the liberated sulfur. The absorption-tower G may be made of large earthenware pipes filled in the way usual with much smaller and shorter pieces of earthenware pipe to break up and distribute the liquor and gas flow. Entering the top of the absorption-tower is a second pipe H, controlled by a suitable valve or lute, (not shown,) which controls the admission of chlorin from any suitable source of supply. Under suitable working conditions which it is easy to obtain the absorption of the chlorin is complete, and the residual gas may be allowed to enter the gas-space I above the liquor-level in the tank and then make its escape by any pipe properly controlled by a suitable valve or lute; but as the top of the liquor will frequently be covered with a froth of sulfur and as at the beginning and end of each operation some chlorin may escape absorption it is better in order to avoid possible chlorination of the sulfur not to allow the residual gases to enter the space at the top of the tank, but to trap the bottom of the tower, by a pipe K, extending into the liquor, and to provide an outlet L at the base of the tower through which opening almost the whole of the residual gases may pass. The falling liquor in the tower exerts a powerful mechanical action on the gases in the tower and produces considerable drafts, which are utilized to draw the chlorin from the source of supply through H, and to force the residual gases out of the apparatus. When a charge is approaching completion, it may be necessary to regulate or to stop the flow of chlorin. This may be done by regulation of the admission gas-valve in H. Toward the end of the chlorination liberated sulfur will begin to float up to the surface of the liquor, and still more will be liberated at a later stage of the process, to be subsequently described. To collect and remove this sulfur scum as it is formed, or at convenient intervals, various means may be employed. Thus the removal may be effected through an opened manhole M by manual labor with scoops and ladles, or by a mechanically-revolving series of chain-buckets that can be exactly raised or lowered to suit the position of the foam and liquor levels, or by means of a suction-nozzle of suitable shape discharging into a closed reservoir in which a partial vacuum is maintained by an air-pump, or through an opening in the side of the tank well under the liquor-level by a skimming-dish attached by a flexible rubber pipe of sufficient bore to the opening. The skimming-dish may be regulated by the liquor-level in any suitable way.

The sulfur scum removed by any of the above methods may be pumped or blown into a filter-press and the filtrate returned to the tank, the sulfur cakes being then washed, and the washings used in the next charge and the cakes of sulfur can then be purified or utilized in any desired way.

If preferred, the agitation of the ore may be effected not only by a heavy flow of the acting liquor, but by an equal flow of air pumped under the surface of the liquor, and in this case of course a special air-pump would be required, and in either case the tank would then preferably be of conical form—say as shown in Fig. 2, although the horizontal section of the tank may be cylindrical or polygonal. With such construction the liquor is charged into the tank through a pipe E, and the liquid leaving by opening F and the valve S would be energetically forced again into the very bottom of the tank through a pipe K to be again circulated in a similar manner. On then adding ore through the charging-pipe E or the manhole M the falling particles would meet the rising current of liquor from the bottom and at some particular point each particle would find a position about which it would remain suspended. A portion of the liquor driven by the centrifugal is allowed to flow by suitably opening a valve S into the top of the absorbing-tower G, where it absorbs the desired amount of chlorin and then returns into the tank, the residuals from the crude chlorin gas escaping, all as before described. Instead of coupling the two circulating systems in this way the gas-absorbing system may be driven by a separate liquor-pump, or, again, the two circulating systems may be combined into one, in which case the tower and its connection-pipe must be so arranged that a sufficient pressure is obtained in the pipe to effectively suspend the ore particles in the tank, or, again, while the liquor is circulating through the tower and the pipes, as already described, the agitation of the liquor and ore may be effected or assisted by a strong current of air forced into the bottom of the tank.

Alternatively the tank may be more or less cylindrical in shape, as shown in Fig. 3, and caused to revolve on a horizontal axis. With such a construction one end of the cylinder would have an opening for introducing liquids or solids and at the other end a larger opening F, preferably fitted with a curved mouthpiece for the outflow of liquid during the rotation, and in the cylindrical portion are one or more openings Q R, small and large, for the decanting of liquor or the removal of heavy sediments, the smaller holes preferably provided with suitable pouring-spouts and the larger holes so large that a laborer could enter to shovel out the material, all such apertures and circumferential openings being closed by suitable covers or plugs. A charge of liquor being run in and the rotation started, so much more liquor is added that it runs out of the other end by the mouthpiece F into a tank N and thence by the centrifugal T is driven to the top of the chlorinating-tower G, and from the bottom of this it returns through trapped pipe K to the cylinder ready to again act upon the ore. The ore would be fed in from a hopper O or otherwise from time to time. Toward the end of the operation the sulfur scum rising would be removed by a suitable skimming-dish and suction-pipe, &c., or it could be allowed to overflow with the circulating liquor into the small tank N, where suitable arrangements may be made to collect and remove the sulfur scum.

When using a fixed tank, as in Fig. 1, the operation would be as follows: The tank would for the initial operation be charged with water, preferably warm and, say, five hundred cubic feet. The stirrer D would be lowered until the blade is but, say, one to two inches from the bottom, and the agitation is begun by running the shaft C at, say, twenty-five revolutions per minute. A quantity of finely-powdered ore, say one-half ton, in the form of wet mud or of dry powder is added. The centrifugal T is then started and the valve S and that in H lifted, preferably only so much that tests of the gas leaving through L show it to be free or almost free of chlorin. After the lapse of an hour or thereabout a further quantity of ore may be added and the chlorin-valve opened farther, but so as still to obtain an almost complete absorption and also particularly so that no free chlorin is present in the liquor and as a perfectly safe guarantee of this, so that the liquor contains a very perceptible portion of its total iron present in the form of ferrous chlorid. After a few hours the liquor contains so much iron dissolved from the ore that the chlorin can be taken up as fast as it can be supplied and yet all the above conditions be complied with. Further charges of ore are then added, so as to make the total for the given quantity of water six tons or more, according to the quality of the ore. The liquor will then be found to contain a large part of its total dissolved iron in the form of ferrous chlorid; but this will slowly decrease, and when it becomes only a small part the admission of chlorin should be decreased and finally stopped; but the agitation should be continued to ascertain by any alteration in the ratio of ferrous to ferric iron if any residual ore remains and is being acted upon. Toward the latter end of the operation the liberated sulfur begins to float up to the surface, forming a scum, which may be allowed to accumulate or may be removed at once, as already mentioned. The liquor in the early stages of the operation will probably be found to be neutral; but toward the end it will probably be found to become somewhat acid, and before proceeding to the next operation it is better to remove at least the greater part of this acidity by adding the necessary amount of an oxid ore, as zinc carbonate, copper carbonate, lead carbonate, or any other suitable material and preferably in a very fine state of division. It will also simplify the next operation if the largest portion of the ferric chlorid necessarily contained in the solution is converted into ferrous chlorid by the addition of the necessary amount of a sulfid ore—for example, some of the original ore—but this time in the condition of the very finest powder or slime. These treatments of the chlorinated liquor with regulated amounts of oxid ores or oxid materials and of sulfid ores are part of the present invention. We have said that the liquid used for the process described should preferably be warm. This is for the purpose of accelerating the reaction, and the necessary temperature—say 50° centigrade—may be obtained by injecting steam, and preferably through a rubber or ebonite tube. During the process of the reaction the temperature rises naturally and may attain 60°–80° centigrade, to which there is no objection. With very rich ores the temperature might become too great. It may be regulated by sucking air though the absorption-tube and blowing out the admixed hot air and steam. In fact, the higher the temperature up to the boiling-point the quicker the reaction of the higher chlorid upon the ore, and consequently a better commercial yield is obtained, as all the zinc contents are converted into zinc chlorid. The progress of the reaction may also be watched by taking the specific gravity of the liquid portion of the slurry, and the end of the reaction is told by the specific gravity ceasing to rise, as well as by the ratio of ferrous to ferric chlorid, &c., already mentioned. It is to be understood that the ore may be added as described or continuously or in one portion at the beginning; but in any case it is advisable after the last portion of ore has been added to continue the treatment with the chlorin, so as to make the decomposition of the ore as complete as possible.

The second step of this invention is of service when the sulfid ore contains metals that can be precipitated in the metallic condition from their salt solutions by the addition of metallic iron or metallic zinc or other metals having the property of throwing down other metals from their salt solutions, but preferably the former. The metals which would be so thrown down are lead, silver, copper, gold, bismuth, mercury, tin, &c., and they are thus readily separated from the remaining metallic constituents, as zinc, iron, manganese, nickel, cobalt, &c., and aluminium, calcium, &c. As complex sulfid ores containing zinc, lead, iron, manganese, silver, copper, and silicious gangue are of very frequent occurrence, we will describe our invention as applied to such an ore, by way of example; but our method is equally applicable to other ores not here specified. The second step consists, then, in adding to the slurry of chlorids, prepared as already described, the necessary quantity of metallic iron as to throw down the whole of the lead, silver, and copper. The iron used for this purpose is preferably in a fine state of division. Cast-iron borings and turnings after grinding and sifting the same through a mesh of sixteen to the linear inch are suitable; but where sufficient of these cannot be obtained they may be well replaced by the very finely divided iron obtained by reducing an iron oxid ore by producer-gas or charcoal at a very moderate heat; but where the revolver form of apparatus is used the iron may be used in the form of scrap-sheet and with great advantage in the form of scrap galvanized sheet, tin, or terne plate, since the excess of iron is no detriment to the agitation, and the excess may be easily removed. In order to reduce the amount of metallic iron to be added, it has already been described how free acid may be removed, or nearly so, by addition of a suitable oxid and how ferric chlorid may be removed, or nearly so, by addition of very finely divided sulfid ore. The reactions require more or less time, according to the size of the iron or zinc particles employed, and during the whole time the agitation must be carried on vigorously. The acid and the ferric chlorid rapidly disappear and the lead in solution then begins to decrease, and the end of the reaction can be readily told by testing a small portion of the clear liquor for lead by potassium iodid. All the suspended crystals of lead chlorid are then converted into spongy lead. The completion of the reaction may be accelerated by the addition of small further quantities of the powdered iron from time to time as found necessary by the tests. Tests may be applied for the completeness of the precipitation of the silver, gold, and copper; but if the lead is completely removed these other metals should also be completely removed. During the above time of reaction a considerable quantity of flocculent sulfur rises as a scum to the surface of the liquid, as just mentioned. This is probably caused by the increased specific gravity of the liquid and by the hydrogen bubbles evolved by the dissolving iron. The sulfur scum is removed and further treated, as previously described. The slurry is now filtered, but in such a manner as to separate as completely as possible the lighter portion consisting, essentially, of finely-divided gangue from the much heavier part consisting, essentially, of metallic spongy lead and copper. To keep the gangue suspended, the agitation must be continued, although it may be advisable to reduce the speed of rotation or to raise the stirrer somewhat further from the bottom of the tank. The turbid liquor should not be drawn off from the bottom hole, but may be drawn off from one or other of a series of holes placed at different heights in the side of the tank, the highest hole being utilized first and the lowest hole last, regulating the action of the stirrer meanwhile in the manner already mentioned. When using the revolver form of tank, the rotation is stopped with the small hole Q above the liquor-level, and the valve attached thereto is opened, and by more or less slowly rotating so as to bring this opening just under the liquid level the lighter slurry may be poured off, while leaving the heavy metallic sponge behind in a very complete manner. During this process the tank empties itself. The opening is then closed, some of the clear filtrate is returned to the revolver, and the metallic sponge washed free from gangue, and then by water it is washed free from zinc, &c., chlorids. The revolver is then drained, the large manhole R opened, and conveniently placed so that the heavy metallic sponge may be removed. The turbid liquor is filtered by any suitable means. Then it may be received in a lead-lined montejus, and thence forced by air-pressure into wooden filter-presses, which when full are washed with water and the cakes removed to be further treated. To remove as much of the gangue as is possible from the spongy metals, some of the clear liquor from the presses is run back into the tank, the agitator run briskly and gradually lowered, then gradually raised and slowed again, and the turbid liquor run and filtered as before. This operation may be repeated several times. The spongy metals may then be washed with water several times in the same fashion to free them from the soluble chlorids of zinc, iron, &c., and, lastly, they are drained in the tank. Instead of iron we may employ low-grade zinc for the reduction. It should be very finely granulated by pouring into water or by agitating the fused metal during solidification, or the shavings used in cyaniding may be used. The filtrate and washings contain zinc chlorid, ferrous chlorid, manganese chlorid, and proportionately very small quantities of sulfates of these metals and are to be worked up as subsequently described.

The heavy metallic residues contain lead, copper, silver, with proportionately very small quantities of gangue, sulfur, and undecomposed ore and excess of metallic iron. They may be treated by ordinary metallurgical process, or they may be still further treated as described subsequently.

It is evident that the three solid products already referred to—viz., first, sulfur; second, gangue; third, metallic spongy lead, &c.—may be separately and again subjected to a similar or any suitable mechanical treatment to complete as much as possible the separation of these bodies from one another. The crude zinc-chlorid liquor is then treated with chlorin and zinc oxid, when the iron is precipitated as ferric oxid and may be filtered off and washed, to be utilized as desired. The filtrate is then freed from manganese chlorid by a second treatment with chlorin and zinc oxid; but this time the liquors should be hot, and steam is therefore injected or the liquor is otherwise heated to about 80° centigrade, when the manganese is precipitated as manganese dioxid and is filtered off and washed, to be utilized as desired. In place of precipitating the iron and manganese separately they may, if desired, be precipitated at one operation by heating and adding a sufficiency of zinc oxid and continuing the treatment with chlorin until both are completely removed. The zinc oxid referred to above need not be pure, but such residual materials containing only, say, twenty-per-cent. zinc oxid as are obtained in various metallurgical and other processes, or in place of zinc oxid may be used zinc carbonate—i. e., calamin. In any case the zinc-oxygen compound should be finely ground, and during the treatment of the mixture with chlorin the whole should be kept well agitated, and we most easily effect the absorption of the chlorin not by blowing the gas through the agitated slurry by pumps, but by the use of an absorption tower and a centrifugal pump, just as described for the treatment of the original sulfid ore. Almost all such forms of zinc-oxygen compounds contain small or even large quantities of calcium compounds, and those react with the small quantity of sulfates contained in the crude zinc-chlorid liquor to form gypsum, the largest part of which is filtered off along with the oxids of iron and manganese, and the purified zinc-chlorid liquor besides containing a very small quantity of gypsum in solution may contain small or large quantities of either calcium chlorid or zinc sulfate. The former is removed by adding the required amount of zinc sulfate, the latter by adding the required amount of calcium chlorid, which may be easily obtained by precipitating another charge of crude zinc-chlorid liquor with a calamin containing a large proportion of lime, or by lime itself. Should, however, the amount of zinc sulfate be considered to be too large to remove it in such a way, it can be essentially removed by evaporating until the specific gravity of the solution rises to 1.5 or 1.6, when the zinc sulfate separates in fine crystals, probably admixed with a little gypsum, and after thorough cooling to render the separation as complete as possible the crystalline paste is separated as completely as possible from the mother-liquor, which is then nearly pure zinc-chlorid solution, and may be utilized as such or may be further purified from traces of admixed impurities by known methods. The crystalline paste is treated with hot water to dissolve the zinc sulfate, filtered, and on cooling zinc sulfate separates, which may be drained and then utilized in any way desired. The zinc-chlorid liquor prepared as already described may be rendered exceedingly pure by small further treatments, as is already known to those acquainted with such work, and the solution may be concentrated or evaporated to fusion and may, where there is a market for such materials, be sold as such, or where it is desired to extract the zinc in the metallic form the solution or the fused material is electrolyzed to obtain metallic zinc of a very high degree of purity and gaseous chlorin, which can enter again its cycle of operations for attacking a further portion of complex sulfid ores in the ways described, so as to allow of the separation of the various valuable constituents of the ore.

The insoluble residue obtained on treating the sulfid ore with chlorin and then with, say, metallic iron contains a small part of the gangue of the crude ore, possibly a small part of the lead in the form of lead sulfate and the rest as metallic lead, all the copper, silver, and gold in the metallic form, and also a very small portion of the sulfur which has been separated in the free form, and any small excess of metallic iron and undecomposed ore. To recover the copper and to decompose any small residual of undecomposed ore, the material placed in a suitable vessel, where it can be agitated with water, is treated with chlorin gas, which gradually converts the metallic iron, lead, copper, and possibly silver and gold, and the undecomposed ore into chlorids, and by filtering this slurry there is obtained a quantity of solution containing all the copper, a very small portion of the lead, and possibly traces of silver and gold, which clear solution may be treated by known methods.

The residue of lead chlorid with small quantities of gangue, sulfur, and lead sulfate may be again agitated with water and finely-divided metallic iron or even zinc-scrap to recover the chlorin in a form which can be converted into pure zinc chlorid by the preceding processes and to convert the lead material into a form that is more readily smelted. These last two processes are best carried out in stone or earthenware revolvers because of the great specific gravity of the solids being treated and the relatively small amount of liquor with which it is desired to treat them. The revolver recommended for treating the original sulfid ore may also be used for this purpose; but it is better to use a smaller revolver or else to save up the metallic sponge from several charges of ore and then treat them all together in the way just described.

This process may be used for the treatment of complex lead-zinc ore, such as that described, even when the metal contents are low. Copper may be used alone or in conjunction with iron as chlorin-carrier. Our process is also applicable to many other ores, such as those containing copper, tin, nickel, lead, and zinc. In such cases the treatment after conversion to chlorids is varied to suit the metals. For example, a copper-zinc-iron ore need not be treated with iron borings after chlorination. The gangue and sulfur are filtered out, and the copper-zinc solution is purified and the metals separated by fractional electrolysis, or the copper may be deposited by metallic zinc. In this case the finely-divided metals alloy to some extent, and the copper finally contains a little zinc, an impurity much less hurtful than the iron in ordinary cement copper.

Having now particularly described and ascertained the nature of our said invention and in what manner the same is to be performed, we declare that what we claim is—

1. The process of treating sulfid ores which consists in submitting the ores to the action of chlorin, in the presence of water and a metal capable of forming both higher and lower chlorids, in such a manner as to form the higher chlorid which immediately reacts on the ore to form chlorids of the metals contained therein and is itself reduced to the lower chlorid, treating the solution in such a manner as to reconvert the lower chlorid into the higher chlorid without permitting free chlorin to come into contact with any sulfur which may have separated, again submitting the ore to the action of the regenerated solution and so on continuously until the desired metals are fully extracted from the ore.

2. The process of treating sulfid ores which consists in submitting the ores to the action of chlorin, in the presence of water and a metal capable of forming both higher and lower chlorids, in such a manner as to form the higher chlorid which immediately reacts on the ore to form chlorids of the metals contained therein and is itself reduced to the lower chlorid, removing the sulfur set free, treating the solution in such a manner as to reconvert the lower chlorid into the higher chlorid, again submitting the ore to the action of the regenerated solution and so on continuously until the desired metals are fully extracted from the ore.

3. The process of treating sulfid ores which consists in submitting the ores to the action of chlorin, in the presence of water and a metal capable of forming both higher and lower chlorid, in such a manner as to form the higher chlorid which immediately reacts on the ore to form chlorids of the metals contained therein and is itself reduced to the lower chlorid, removing the sulfur set free, treating the solution in such a manner as to reconvert the lower chlorid into the higher chlorid, again submitting the ore to the action of the regenerated solution and so on continuously until the desired metals are fully extracted from the ore, treating the resultant chlorid product with a metal which will combine with chlorin as a soluble chlorid and throw down the metals previously existing as practically insoluble chlorids such as lead chlorid.

4. The process of treating sulfid ores which consists in submitting the ores to the action of chlorin, in the presence of water and a metal capable of forming both higher and lower chlorids, in such a manner as to form the higher chlorid which immediately reacts on the ore to form chlorids of the metals contained therein and is itself reduced to the lower chlorid, removing the sulfur set free with the lower chlorids, separating the sulfur therefrom and treating the solution in such a manner as to reconvert the lower chlorid into the higher chlorid, again submitting the ore to the action of the regenerated solution and so on continuously until the desired metals are fully extracted from the ore.

5. The process of treating sulfid ores which consists in submitting the ores to the action of chlorin, in the presence of water and metal capable of forming both higher and lower chlorids, in such a manner as to form the higher chlorid which immediately reacts on the ore to form chlorids of the metals contained therein and is itself reduced to the lower chlorid, removing the sulfur set free with the lower chlorids, separating the sulfur therefrom and treating the solution in such a manner as to reconvert the lower chlorid into the higher chlorid, again submitting the ore to the action of the regenerated solution and so on continuously until the desired metals are fully extracted from the ore, treating the resultant chlorid product with a metal which will combine with chlorin as a soluble chlorid and throw down the metals previously existing as practically insoluble chlorids such as lead chlorid.

6. The process of treating sulfid ores which consists in submitting the ores to the action of chlorin, in the presence of water and a metal capable of forming both higher and lower chlorids, in such a manner as to form the higher chlorid which immediately reacts on the ore to form chlorids of the metals contained therein and is itself reduced to the lower chlorid, removing the sulfur set free, treating the solution in such a manner as to reconvert the lower chlorid into the higher chlorid, again submitting the ore to the action of the regenerated solution and so on continuously until the desired metals are fully extracted from the ore, treating the resultant chlorid product with a metal which will combine with chlorin as a soluble chlorid and throw down the metals previously existing as practically insoluble chlorids such as lead chlorid, then separating the metals thrown down by reconverting them into chlorid salts in the presence of but little water, separating the chlorid solution so produced from the practically insoluble salts and again but separately throwing down the metals from their chlorids by the addition of a metal having a greater affinity for chlorin.

In testimony whereof we have hereunto set our hands in the presence of two subscribing witnesses.

HARRY BAKER.
ANDREW THOMAS SMITH.

Witnesses:
ERNEST TWEEDLE,
ROBERT SIDNEY SMITH.